United States Patent Office
2,709,164
Patented May 24, 1955

2,709,164

PROCESS FOR THE PRODUCTION OF PEPTIDES

Theodor Wieland, Mainz, Germany, assignor to "C. H. Boehringer Sohn," Ingelheim am Rhein, Germany, a partnership No Drawing. Application April 1, 1952, Serial No. 279,928

Claims priority, application Germany April 2, 1951

8 Claims. (Cl. 260—112)

The present invention relates to a process for the production of peptides and represents a further development of the process of copending patent application Serial No. 215,865, filed March 15, 1951.

According to the process of the said copending application, peptides are produced from amino acids or low molecular peptides in such a manner, that one reacts anhydrides of amino acids or low molecular peptides and a suitable carboxylic acid of the general formula

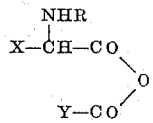

with amino acids, low molecular peptides or their esters of the general formula H₂N—Z by adding the calculated amount of base to peptides of the general formula

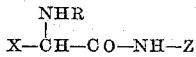

In these formulae: R means an acyl-, or another residue adapted to protect an amino group, and which can afterwards be readily split off, X is an organic residue, such as is present in amino acids or peptides, Y is a hydrogen atom, an alkyl-, aryl-, aralkyl-, alkoxy- or similar group and Z is a radical present in the reacting amino group of the amino acid or peptide used.

In accordance with the present invention, peptides of the above mentioned general formula are produced by reacting compounds which are produced from amino acids or low molecular peptides and mercaptans, and can be regarded as equivalent to the anhydrides in the said copending application, and which are formally therefore derived from acylated mercaptans of the general formula

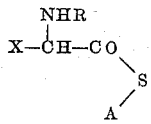

wherein X and R have the above mentioned meaning and A is an alkyl-, aryl-, aralkyl- or a similar radical, which may if desired be substituted, with amino acids or low molecular peptides or their esters of the general formula H₂N—Z. The variation of the process of the said copending application consists in the use of compounds in which the suitable carboxylic acid Y—COOH is replaced by aliphatic or aromatic mercaptans, which can be regarded as acids. The acylated mercaptans are converted under mild conditions with amino acids, low molecular peptides or their esters by adding the calculated amount of base into the peptides, in a manner like the mixed anhydrides used in the said copending application.

The acylated mercaptans used according to the invention can be produced, by reacting mixed anhydrides of the acids required for the acylation of the mercaptans with suitable carboxylic acids, if desired in the presence of acid binding media, under mild conditions with mercaptans.

The process according to the invention will be explained below more clearly by means of examples:

EXAMPLE 1

Carbobenzoxy-glycyl-valine 2.3 g. of carbobenzoxythioglycin-S-methyl ester are heated for a few hours under reflux in a solution of 1.1 g. of valine in 5 ccm. of 2N caustic soda lye and 10 ccm. of methanol. With formation of methyl mercaptan the solution takes on a neutral reaction. It is then freed from methanol in vacuo and the aqueous solution is made acid to Congo red with hydrochloric acid. 3.5 g. of crystals of M. P.=146° were obtained; no depression with an authentic specimen.

EXAMPLE 2

Carbobenzoxyglycyl-phenylalanyl-alanine or glycylphenylalanyl-alanine 2.4 g. of carbobenzoxyglycyl-[phenylthio-alanyl]-S-phenyl ester are reacted, as described in Example 1, with 1 g. of alanine. On acidifying the neutral aqueous solution freed from thiophenol by extracting with ether the carbobenzoxy tripeptide precipitates as a viscous oil (2.7 g.), which did not crystallize. After drying it was de-acylated in known manner by treatment with sodium in liquid ammonia. The free tripeptide thus obtained contained after recrystallization from water-ethanol N, 13.96%; calculated N, 14.30%.

EXAMPLE 3

β-Alanine-tripeptide 3 g. of toluenesulfo-β-alanyl-thiophenyl ester dissolved in 30 ccm. of methanol are heated 4 hours under reflux with 1.6 g. of β-alanine dipeptide dissolved in 10 ccm. of concentrated sodium bicarbonate solution. The mixture is concentrated in vacuo. The residue thus obtained is digested with ether then taken up in a little water and acidified with hydrochloric acid. After a second concentration in vacuo the oily residue can easily be transformed in the β-alanine-tripeptide by splitting off of the toluenesulfonyl radical according to the method R. Schönheimer (Zeitschr. f. Physiol. Chem. 154, 203 (1926)).

The yield is 1.1 g., corresponding to 48%.

According to the present invention there is provided a process for the preparation of peptides in which thioesters of aminoacids or peptides of lower molecular weight than the peptides to be prepared with any desired mercaptan, are reacted with approximately stoichiometric proportions of aminoacids or peptides of lower molecular weight than the peptides to be prepared or their esters.

The variation of the process of the co-pending application Serial No. 215,865 consists in replacing the anhydrides of aminoacids or peptides with a suitable carboxylic acid by thioesters of aminoacids or peptides. The thioesters are converted under mild conditions with aminoacids, or peptides of low molecular weight or their esters by adding at least equimolecular amounts of base to the mixture of the reactants. This may be illustrated by way of example only by the following equation which relates to the production of carbobenzoxyglycyl-valine by the process according to Example 1 above.

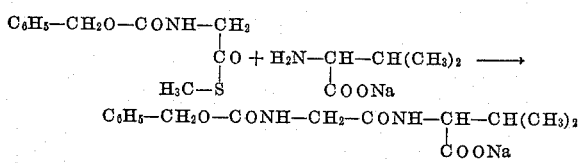

The thioesters employed react very rapidly both in the solid state and also dissolved in an inert solvent with amino acids or peptides of lower molecular weight on the addition of at least equimolecular amounts of dilute alkali to yield the desired peptides.

What I claim is:

1. The method of producing polypeptides which comprises reacting a thioester of a compound selected from the group consisting of monocarboxylic amino acids and monocarboxylic peptides having at least one peptide group in their molecule, said thioester being selected from the group consisting of aliphatic, aromatic and aliphatic-aromatic thioesters, with a primary amine having the general structural formula $H_2N-Z$ wherein Z is a radical selected from the group consisting of aminoacid radicals and peptide radicals having at least one peptide group in their molecule, in substantially equimolecular proportions, and separating the reaction product in the form of the desired polypeptide from the reaction mass.

2. The method of producing peptides which comprises reacting a thioester selected from the group consisting of aliphatic, aromatic and aliphatic-aromatic thioesters of a compound selected from the group consisting of monocarboxylic amino acids and monocarboxylic peptides having at least one peptide group in their molecule, with a primary amine having the general structural formula $H_2N-Z$, wherein Z is an aminoacid radical, in substantially equimolecular proportions, and separating the reaction product in the form of the desired peptide from the reaction mass.

3. The method of producing polypeptides which comprises reacting a thioester of a compound selected from the group consisting of monocarboxylic amino acids and monocarboxylic peptides having at least one peptide group in their molecule, said thioester being selected from the group consisting of aliphatic, aromatic and aliphatic-aromatic thioesters, with a primary amine having the general structural formula $H_2N-Z$ wherein Z is a peptide radical having at least one peptide group in its molecule in substantially equimolecular proportions, and separating the reaction product in the form of the desired polypeptide from the reaction mass.

4. The method of producing polypeptides as in claim 1, which in addition comprises carrying out the reaction in the presence of an inorganic base.

5. The method of producing polypeptides as in claim 1, which in addition comprises carrying out the reaction in the presence of an inert organic solvent.

6. The method of producing polypeptides as in claim 5, in which the inert organic solvent is a lower aliphatic alcohol.

7. The method of producing polypeptides as in claim 5, in which the inert organic solvent is methanol.

8. The method of producing polypeptides as in claim 5, in which the inert organic solvent is an aqueous solution of methanol.

References Cited in the file of this patent

Anson et al.: "Advances in Protein Chemistry," vol. 5, pp. 6–8, 23–31 (1949).